(12) United States Patent
Kuroda

(10) Patent No.: US 10,220,451 B2
(45) Date of Patent: Mar. 5, 2019

(54) END MILL AND METHOD FOR MANUFACTURING MACHINED PRODUCT

(71) Applicant: KYOCERA Corporation, Kyoto-shi, Kyoto (JP)

(72) Inventor: Masahiko Kuroda, Higashiomi (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 45 days.

(21) Appl. No.: 15/529,685

(22) PCT Filed: Nov. 26, 2015

(86) PCT No.: PCT/JP2015/083172
§ 371 (c)(1),
(2) Date: May 25, 2017

(87) PCT Pub. No.: WO2016/084877
PCT Pub. Date: Jun. 2, 2016

(65) Prior Publication Data
US 2017/0326655 A1 Nov. 16, 2017

(30) Foreign Application Priority Data
Nov. 27, 2014 (JP) .................. 2014-239991

(51) Int. Cl.
*B23C 5/10* (2006.01)

(52) U.S. Cl.
CPC ........ *B23C 5/10* (2013.01); *B23C 2210/0485* (2013.01); *B23C 2210/0492* (2013.01);
(Continued)

(58) Field of Classification Search
CPC .... B23C 2210/0485; B23C 2210/0492; B23C 2210/40; B23C 2210/402;
(Continued)

(56) References Cited

U.S. PATENT DOCUMENTS

| 5,433,655 A | 7/1995 | Shiokawa et al. |
| 9,381,581 B1 * | 7/2016 | Zaman ................ B23C 5/10 |

(Continued)

FOREIGN PATENT DOCUMENTS

| JP | S61-199315 U | 12/1986 |
| JP | 06-155130 A | 6/1994 |

(Continued)

OTHER PUBLICATIONS

International Search Report (Form PCT/ISA/210) dated Feb. 16, 2016, issued for PCT/JP2015/083172.
(Continued)

*Primary Examiner* — Will Fridie, Jr.
(74) *Attorney, Agent, or Firm* — Viering, Jentschura & Partner MBB

(57) ABSTRACT

A end mill includes: an end mill body having a rotation axis, the end mill body including a shank portion and a cutting portion with an outer peripheral cutting edge; an end cutting edge including a first cutting edge and a second cutting edge; a first gash opening between the first cutting edge and the second cutting edge; and a second gash located adjacently to the first gash in the rotational direction, and opening to a side closer to the outside peripheral from the chisel portion. A ratio (L1/L2) of a length (L1) from a distal end of the end mill body to a terminal end of the first gash to a length (L2) from the distal end of the end mill body to a terminal end of the second gash, when viewed from a side, is from 0.8 to 1.1.

8 Claims, 4 Drawing Sheets

(52) U.S. Cl.
CPC ...... *B23C 2210/08* (2013.01); *B23C 2210/20* (2013.01); *B23C 2210/203* (2013.01); *B23C 2210/282* (2013.01); *B23C 2210/40* (2013.01); *B23C 2230/00* (2013.01); *B23C 2250/16* (2013.01)

(58) Field of Classification Search
CPC ........ B23C 2210/405; B23C 2210/407; B23C 5/10; B23C 5/1009
See application file for complete search history.

(56) References Cited

U.S. PATENT DOCUMENTS

| | | | |
|---|---|---|---|
| 9,884,379 B1* | 2/2018 | Budda | B23C 5/10 |
| 2004/0170480 A1* | 9/2004 | Kawai | B23C 5/10 407/53 |
| 2011/0211922 A1* | 9/2011 | Maeda | B23C 5/1009 407/54 |
| 2012/0020749 A1* | 1/2012 | Maeda | B23C 5/003 407/42 |
| 2014/0133926 A1* | 5/2014 | Budda | B23C 5/1009 407/54 |
| 2014/0227050 A1* | 8/2014 | Budda | B23C 5/10 407/54 |
| 2015/0266113 A1* | 9/2015 | Fukata | B23C 5/10 407/11 |
| 2016/0214187 A1* | 7/2016 | Fukata | B23C 5/10 |
| 2016/0303664 A1* | 10/2016 | Azegami | B23C 5/1009 |
| 2017/0282261 A1* | 10/2017 | Sakai | B23C 5/10 |
| 2017/0312836 A1* | 11/2017 | Kuroda | B23C 5/10 |
| 2018/0036809 A1* | 2/2018 | Maeda | B23C 5/10 |

FOREIGN PATENT DOCUMENTS

| | | |
|---|---|---|
| JP | 07-040021 U | 7/1995 |
| JP | 2000233311 A | 8/2000 |
| JP | 2001334405 A | 12/2001 |
| JP | 2004-141975 A | 5/2004 |
| JP | 2004-223642 A | 8/2004 |
| JP | 2004276142 A | 10/2004 |
| JP | 2005224898 A | 8/2005 |
| JP | 2008-044040 A | 2/2008 |
| JP | 2010-30044 A | 2/2010 |
| JP | 2012-091306 A | 5/2012 |
| JP | 2013-202722 A | 10/2013 |

OTHER PUBLICATIONS

Written Opinion (Form PCT/ISA/237) dated Feb. 16, 2016, issued for PCT/JP2015/083172.

* cited by examiner

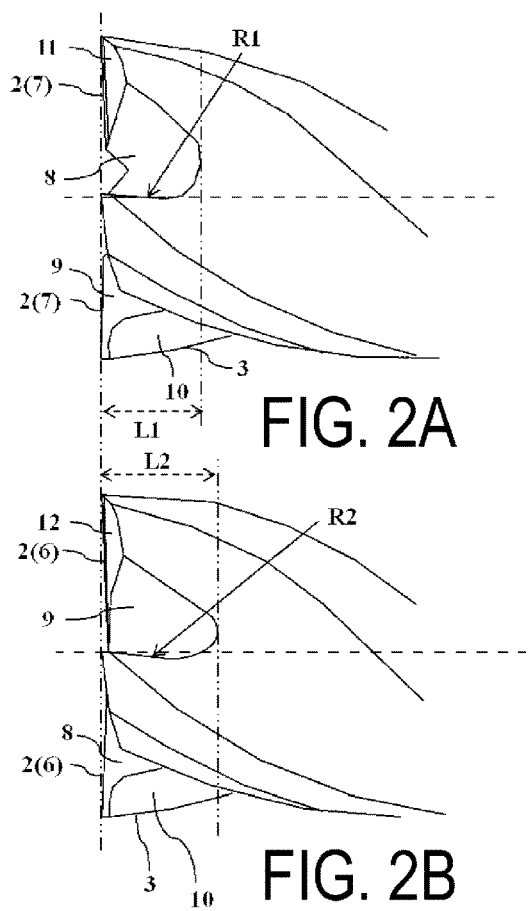
FIG. 2A
FIG. 2B
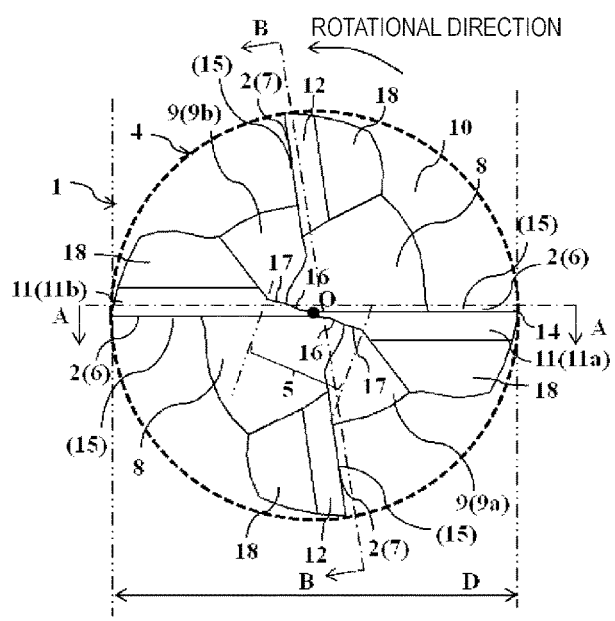
FIG. 3

END MILL AND METHOD FOR MANUFACTURING MACHINED PRODUCT

TECHNICAL FIELD

The present embodiment relates to an end mill and a method for manufacturing a machined product.

BACKGROUND ART

An end mill is used for slot milling or side cutting a workpiece, and the like. For example, Patent Document 1 describes a four-flute end mill that includes, as end cutting edges, two long cutting edges (8b, 8d) and two short cutting edges (8a, 8c). The two long cutting edges (8b, 8d) extend from an outer periphery, connect to a chisel portion, and are point symmetrical with a rotational axis serving as the center of symmetry. The two short cutting edges (8a, 8c) are located between the long cutting edges and away from the chisel portion, extending from the outer periphery toward the rotational axis side.

In such an end mill, the cutting resistance during cutting is known to be large at the center of the end mill, that is, near the rotational axis. Here, in Patent Document 1, a gash on a side of the short cutting edge is cut to an area near the rotational axis, thereby forming a chisel portion having a thin thickness at a position between the long cutting edges that includes the rotational axis, and thus decreasing flaws near the rotational axis. According to the end mill in Patent Document 1, the end mill has between the chisel portion and a tip relief face that continues to the chisel portion, a thickness that locally decreases and a thick thickness on both sides of the thickness, and forms a V-shaped bend point, when viewed from a distal end.

Patent Document 2 describes an end mill that has a thickness between the chisel portion and the tip relief face that gradually decreases, and does not form a bend point.

CITATION LIST

Patent Literature

Patent Document 1: Japanese Unexamined Patent Application Publication No. 2004-141975A Patent Document 2: Japanese Unexamined Patent Application Publication No. 2013-202722A

SUMMARY OF INVENTION

Solution to Problem

An end mill includes: an end mill body having a rotational axis, the end mill body including a cutting portion and a shank portion; a chisel portion located on a distal end side of the end mill body and having the rotational axis; an end cutting edge including two first cutting edges located on the distal end side of the end mill body, the two first cutting edges, when viewed from a distal end, extending from an outer periphery to connect with the chisel portion and being point symmetrical with the rotational axis serving as a center of symmetry, and an even number of second cutting edges located between the two first cutting edges and away from the chisel portion, extending from the outer periphery toward a side closer to the rotational axis; a first gash opening between a first cutting edge of the two first cutting edges and a second cutting edge of the even number of second cutting edges from the chisel portion and at least a portion of the first cutting edge of the two first cutting edges on a side closer to the chisel portion; and a second gash located adjacently to the first gash in a rotational direction, and opening to a side closer to the outer peripheral from a side closer to the chisel portion.

A ratio (L1/L2) of a length L1 from the distal end of the end mill body to a terminal end of the first gash to a length L2 from the distal end of the end mill body to a terminal end of the second gash, when viewed from a side, is from 0.8 to 1.1.

BRIEF DESCRIPTION OF DRAWINGS

FIG. 2A is an enlarged view of a main part of the first gash 8 in FIG. 1A, and FIG. 2B is an enlarged view of a main part of a second gash 9 in FIG. 1B.

FIG. 3 is a front view of the end mill in FIGS. 1A and 1B when viewed from a distal end.

DESCRIPTION OF EMBODIMENTS

Figures 1A, 1B:
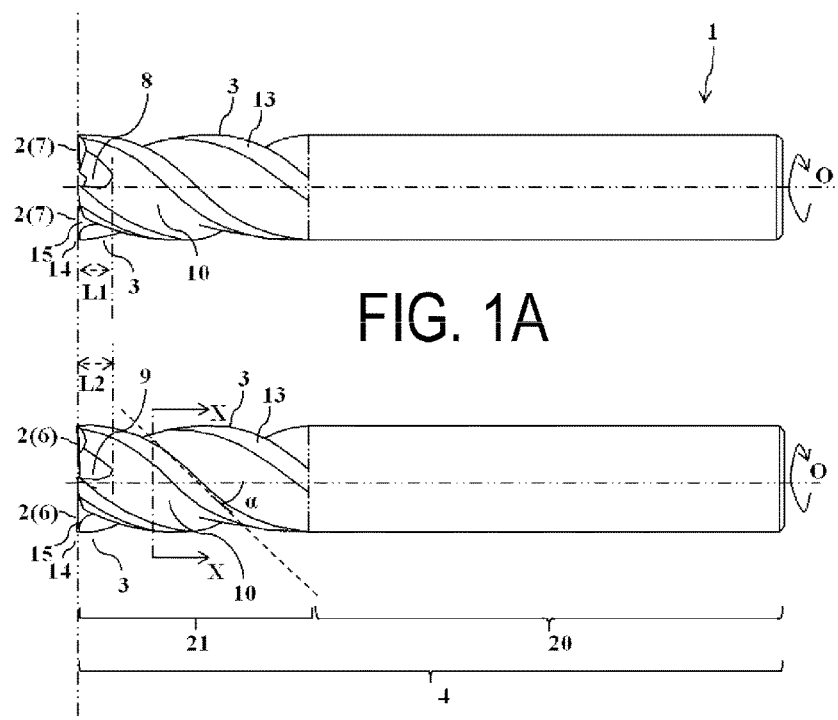
FIG. 1A is a side view including a first gash of an end mill according to a present embodiment.
FIG. 1B is a side view including a second gash with the end mill of FIG. 1A rotated 90°.

An end mill 1 illustrated in FIGS. 1A to 5B is a solid end mill. As is clear from the descriptions of FIGS. 1A, 1B, and 3, the end mill 1 is provided with an end mill body 4 having a substantially cylindrical shape with a diameter D, and including a rotational axis O of the end mill 1. Note that, in FIGS. 1A and 1B, the rotational axis O is indicated by an alternate long and two short dashed line. The end mill body 4, as illustrated in FIGS. 1A and 1B, includes a shank portion 20 and a cutting edge portion 21. Then, the end mill body 4 is made from a hard material such as a cemented carbide alloy, a cermet, or a cubic boron nitride (cBN).

The end mill 1, as illustrated in FIG. 3 which is a distal end view of the end mill 1, is provided with a chisel portion 5 including the rotational axis O. Further, the end mill 1 is provided with end cutting edges 2 including two first cutting edges 6 extending from an outer periphery to connect with the chisel portion 5, the two first cutting edges 6 being point symmetrical with the rotational axis O serving as a center of symmetry, and an even number of second cutting edges 7 located between the first cutting edges 6 and away from the chisel portion 5, extending from the outer periphery toward the rotational axis O side. The end mill 1 further includes a first gash 8 opening between the first cutting edge 6 and the second cutting edge 7 from the chisel portion 5 and at least a portion of the first cutting edge 6 on the chisel portion 5 side. Additionally, the end mill 1 further includes a second gash 9 located adjacently to the first gash 8 in a rotational direction, and opening to the outer peripheral side from the chisel portion 5.

The chisel portion 5, as illustrated in FIG. 3, is a portion cut out by the first gash 8 and the second gash 9, and has a thickness that gradually decreases from the outer peripheral side toward the rotational axis O side, when viewed from the distal end. The area of the chisel portion 5 from a position that connects to the first cutting edge 6 to a position closest to the rotational axis O functions as a cutting edge.

In FIG. 3, there is a total of two second cutting edges 7, one between the first cutting edges 6 on each side. That is, the end mill 1 has four cutting edges. While the number of first cutting edges 6 serving as so-called long cutting edges is limited to two, the number of second cutting edges 7 serving as so-called short cutting edges is not limited to one between the first cutting edges 6 on each side as long as there is an even number, allowing a quantity such as two or three between the first cutting edges 6 on both sides. That is, the number of cutting edges of the end cutting edges 2 of the end mill 1 is an even number of four or greater.

Further, the circle indicated by the dotted line in FIG. 3 is equivalent to a locus of rotation of outer peripheral ends of the end cutting edges 2 and outer peripheral cutting edges 3.

The first cutting edges 6 each include a first rear surface 11 (hereinafter referred to as "first relief face") that is located rearward in the rotational direction and serves as a relief face when cutting using the first cutting edge 6. The chisel portion 5 in FIG. 3 is located extending from a region where the first relief face 11 (11a) of one of the first cutting edges 6 and the second gash 9 (9a) connect to the rotational axis O, and from the rotational axis O to a region where the first relief face 11 (11b) of the other first cutting edge 6 and the second gash 9 (9b) connect.

Further, in the end mill 1, as illustrated in FIG. 3, the second cutting edges 7 each include a second rear surface 12 (hereinafter referred to as "second relief face") that is located rearward in the rotational direction and serves as a relief face when cutting using the second cutting edge 7. Furthermore, the first relief face 11 and the second relief face 12 each include a number two relief face 18 adjacent thereto, rearward in the rotational direction.

Further, as illustrated in FIGS. 1A and 1B, the end mill 1 includes the outer peripheral cutting edges 3 each located rearward of the end cutting edges 2, and flutes 10 each located between the outer peripheral cutting edges 3. The flutes 10 are each provided to the outer periphery of the end mill body 4 in a spiral shape, from the distal end of the end mill body 4 across a predetermined length. Further, the outer peripheral cutting edges 3 provided rearward of each of the end cutting edges 2 exist on the outer peripheral end of each of the flutes 10. A lateral relief face 13 exists rearward of each of the outer peripheral cutting edges 3 in the rotational direction. The outer peripheral cutting edge 3 and the end cutting edge 2 are smoothly connected at a corner 14. As illustrated in FIGS. 1A and 1B, the first gash 8 and the second gash 9 are each located between the flute 10 and the end cutting edge 2 when viewed from a side.

The end cutting edges 2 and rake faces 15 are formed by the first gash 8 and the second gash 9. The rake face 15 is an area in which the flute 10 is cut out by the first gash 8 or the second gash 9. In FIG. 3, although the rake faces 15 cannot be seen, the positions of the rake faces 15 are indicated by the reference characters in parentheses. The first cutting edge 6 is located on a ridgeline that intersects the rake face 15 and the first relief face 11, and the second cutting edge 7 is located a ridgeline that intersects the rake face 15 and the second relief face 12.

In the present embodiment, a ratio (L1/L2) of a length L1 from the distal end of the end mill body 4 to a terminal end of the first gash 8 to a length L2 from the distal end of the end mill body 4 to a terminal end of the second gash 9, as illustrated in the side view in FIGS. 1A and 1B, is from 0.8 to 1.1. This makes it possible to decrease the difference between the capacities of the flutes 10 for the first cutting edge 6 and the second cutting edge 7 near the distal end of the end mill 1, thereby improving the chip dischargeability of the end mill 1 as a whole. That is, the second gash 9 of the second cutting edge 7 is less apt to be significantly smaller than the two first gashes 8 adjacent in the rotational direction of the first cutting edge 6. Therefore, the difference between the capacities of the flutes 10 is small, and then it is possible to decrease chip clogging in the second gash 9 of the second cutting edge 7 and enhance the chip dischargeability of the end mill 1 as a whole.

Further, in the present embodiment, as illustrated in FIGS. 2A and 2B, an area S1 (not illustrated) of the first gash 8 is smaller than an area S2 (not illustrated) of the second gash, when viewed from a side. This makes it possible to decrease the difference between the capacities of the flutes 10 near the distal end of the end mill 1 of the first cutting edge 6 and the second cutting edge 7, thereby improving the chip dischargeability of the end mill 1 as a whole. Note that the area Si of the first gash 8 and the area S2 of the second gash when viewed from a side is the maximum area of the respective first gash 8 and second gash 9 when viewed from a side of the end mill 1. In other words, the maximum area of the first gash 8 when viewed from a side is smaller than the maximum area S2 of the second gash when viewed from a side.

In the present embodiment, as illustrated in FIGS. 2A and 2B, the first gash 8 and the second gash 9 each include a recessed curved surface rearward in the rotational direction. This makes it possible to disperse the stress applied to end portions of the rake face 15 and decrease significant chipping on the end cutting edge 2 side caused by impact during cutting. At this time, when a radius of curvature of the recessed curved surface of the second gash 9 is greater than a radius of curvature of the recessed curved surface of the first gash 8, a decrease in chip dischargeability as a result of obstruction of the discharge direction of the chips in the first gash 8 is less apt to occur. Further, in the second gash 9, the thickness on the second cutting edge 7 side is less likely to be thin, making it possible to maintain the strength on the second cutting edge 7 side.

In the present embodiment, as illustrated in the front view from the distal end in FIG. 3, the thickness of the chisel portion 5 gradually decreases from the first tip surface 11 on the outer periphery toward the rotational axis O, when viewed from the distal end. That is, a V-shaped bend point having a thickness that decreases locally from the first tip surface 11 to the chisel portion 5 does not exist. Without the existence of a bend point where stress concentrates during cutting, chipping of the chisel portion 5 is decreased.

Here, in the present embodiment, as illustrated in FIG. 3, a connecting portion 16 with the chisel portion 5 of the first gash 8 has a circular arc shape and, continuous with the connecting portion 16, a connecting portion 17 with the chisel portion 5 of the second gash 9 has a linear shape or a circular arc shape having a radius of curvature greater than the radius of curvature of the connecting portion 16. The connecting portion 16 and the connecting portion 17 are connected at an obtuse angle. The thickness of the chisel portion 5 at the rotational axis O is from 0.01×D to 0.04×D with respect to the diameter D of the end mill 1.

Furthermore, a ratio (S3/S4) of an area S3 (not illustrated) of the first relief face 11 to an area S4 (not illustrated) of the second relief face 12 in FIG. 3 is from 1.0 to 1.2. This makes it possible to decrease the difference between the capacities of the flutes 10 near the distal end of the end mill 1 of the first cutting edge 6 and the second cutting edge 7, thereby improving the chip dischargeability of the end mill 1 as a whole.

Figure 5A:
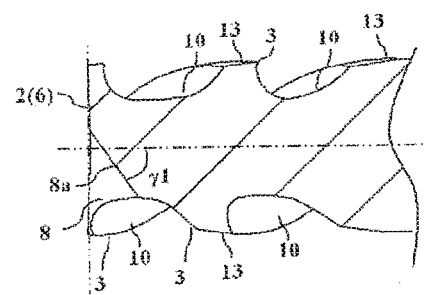
FIG. 5A is a cross-sectional view along A-A in FIG. 3.
Figure 5B:
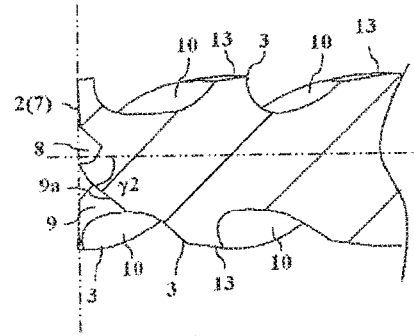
FIG. 5B is a cross-sectional view along B-B in FIG. 3.

Further, as in the cross-sectional view along the rotational axis O of the end mill 1 which includes the first gash 8 illustrated in FIG. 5A, and the cross-sectional view along the rotational axis O of the end mill 1 which includes the second gash 9 illustrated in FIG. 5B, a first angle $\gamma 1$ formed between the rotational axis O and a contour of the first gash 8 located frontward in the rotational direction is greater than a second angle $\gamma 2$ formed between the rotational axis O and a contour of the second gash 9 located frontward in the rotational direction. This makes it possible to decrease the difference between the capacities of the flutes 10 near the distal end of the end mill 1 of the first cutting edge 6 and the second cutting edge 7, thereby improving the chip dischargeability of the end mill 1 as a whole. In the present embodiment, the first angle $\gamma 1$ is from 45 to 70°, and the second angle $\gamma 2$ is from 30 to 60°.

Figure 4:
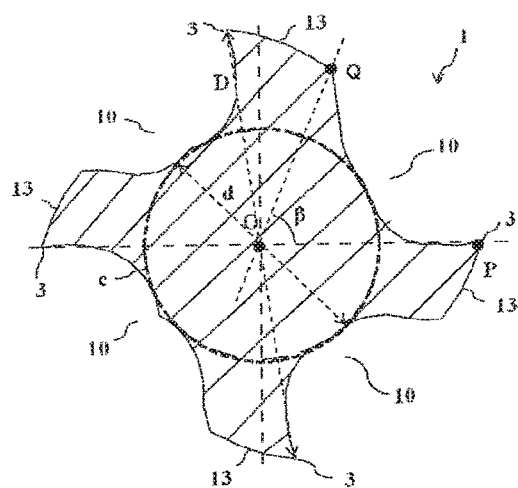
FIG. 4 is a cross-sectional view of the end mill along X-X in FIG. 1B.

Also, in a cross section orthogonal to the rotational axis O at a position where the flute 10 is present as illustrated in FIG. 4, a web thickness d is from 0.5 to 0.8 times the diameter D of the end mill 1. When the web thickness d is within this range, the strength of the end mill 1 increases, making it possible to decrease damage to the end mill 1. Note that the web thickness d is defined as the diameter of a largest circle c that can be drawn in a center portion of the end mill 1 indicated by the dashed line in FIG. 4, and is equal to the distance between the deepest points of the flutes 10.

Furthermore, although the preferred range of an opening angle $\beta$ of each of the flutes 10 differs according to the number of outer peripheral cutting edges 3, the preferred range of the opening angle $\beta$ of each of the flutes 10 illustrated in FIG. 4 may be from 30 to 80°. When opening angle $\beta$ is within this range, chip clogging is less apt to occur in the flutes 10, and a chip is less apt to be curled by the flute 10 and to fly out of the flute 10. Note that the opening angle $\beta$ of the flute 10 illustrated in FIG. 4 is defined by the angle formed between the straight line (indicated by the dashed line) that joins an outer peripheral end P of the flute 10 on the outer peripheral cutting edge 3 side and the rotational axis O, and the straight line (indicated by the dashed line) that joins an outer peripheral end Q of the flute 10 on the lateral relief face 13 side and the rotational axis O.

In the present embodiment, a helix angle a of the outer peripheral cutting edge 3 illustrated in FIG. 1B is from 30 to 60°. This range of the angle reduces the component of cutting resistance in the direction orthogonal to the rotational axis O, yielding an effect of reducing the load to the tool.

In the present embodiment, as illustrated in FIG. 3, the angle formed between the first cutting edge 6 and the second cutting edge 7 adjacent in the rotational direction is greater than the angle formed between the second cutting edge 7 and the first cutting edge 6 adjacent in the rotational direction, resulting in unequal division.

This leads to sympathetic vibration of the end mill 1 during cutting, making it possible to decrease the occurrence of chattering. Additionally, at least one helix angle $\alpha$ of the outer peripheral cutting edge 3 may be different from other helix angle $\alpha$, which forms a variable-lead end mill.

In the end mill 1 of the present embodiment, the cutting edges can be regenerated by re-polishing. Specifically, the end cutting edges 2 and the outer peripheral cutting edges 3 can be regenerated by a re-polishing process of the flutes 10 and the gashes of the rake faces 15.

Method for Manufacturing a Machined Product

Next, description will be given of a method for manufacturing a machined product according to the present embodiment using FIGS. 6A to 6C.

Figure 6A:
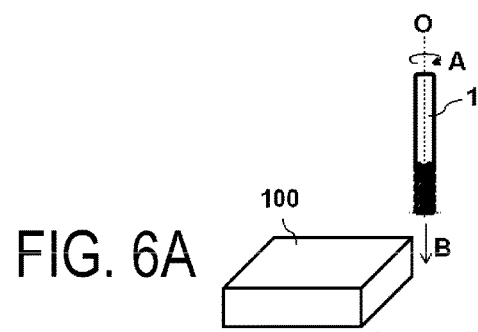
FIGS. 6A to 6C are schematic views illustrating a method for manufacturing a machined product that uses the end mill of the present embodiment.

In the present embodiment, the end mill 1 attached to an arbor (not illustrated) is moved in the direction of the arrow B while rotated in the direction of the arrow A with the rotational axis O of the end mill 1 serving as reference, thereby causing the end mill 1 to come close to a workpiece 100, as illustrated in FIG. 6A.

Figure 6B:
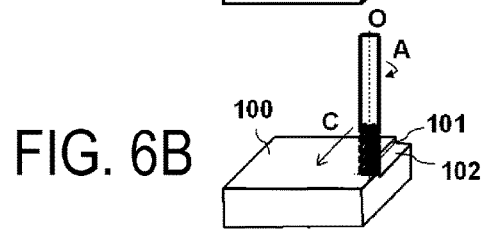

Next, as illustrated in FIG. 6B, the end cutting edges 2 and the outer peripheral cutting edges 3 of the end mill 1 being rotated are brought into contact with a surface of the workpiece 100. Specifically, the end mill 1 that is rotating is moved in the direction of arrow C, which is orthogonal to the rotational axis O, and the end cutting edges 2 and the outer peripheral cutting edges 3 are brought into contact with the surface of the workpiece 100. As a result, the surface to be cut of the workpiece 100 mainly brought into contact with and cut by the outer peripheral cutting edges 3 of the cutting edges becomes the cut surface 101. Further, the surface to be cut of the workpiece 100 cut by the end cutting edges 2 becomes a finished surface 102.

Figure 6C:
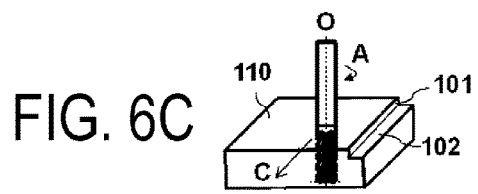

Once machining is completed, as illustrated in FIG. 6C, the end mill 1 is moved as is in the direction of the arrow C and separated from the workpiece 100, yielding a desired machined product 110. The end mill 1 has good cutting capabilities because of the above reasons, making it possible to yield the machined product 110 having good machined surface accuracy.

Note that, when the machining is continued, steps of bringing the end mill 1 into contact with different positions on the workpiece 100 while maintaining the rotating state of the end mill 1 may be repeated. While the end mill 1 is brought close to the workpiece 100 in the present embodiment, making the end mill 1 and the workpiece 100 relatively close is sufficient. Thus, for example, the workpiece 100 may be brought close to the end mill 1. The same applies to the step of moving the end mill 1 away from the workpiece 100 as well.

Preferred embodiments according to the present invention are described above. However, the present invention is not limited to the aforementioned embodiments, and naturally includes various modifications within a scope that does not deviate from the spirit of the present invention.

REFERENCE SIGNS LIST

1 End mill
2 End cutting edge
3 Outer peripheral cutting edge
4 End mill body
5 Chisel portion
6 First cutting edge
7 Second cutting edge
8 First gash
9 Second gash
10 Flute
11 First rear surface (first relief face)
12 Second rear surface (second relief face)
13 Lateral relief face
14 Corner
15 Rake face
16 First connecting portion
17 Second connecting portion
18 Number two relief face
20 Shank portion
21 Cutting edge portion
O Rotational axis
D Diameter of end mill
$\alpha$ Helix angle β Opening angle
γ1 First angle
γ2 Second angle
c The largest circle that can be drawn in the center portion of the end mill in a cross section orthogonal to the rotation center axis at a position where the flute is present
d Web thickness

The invention claimed is:

1. An end mill comprising:
   an end mill body having a rotational axis, the end mill body comprising a shank portion and a cutting portion including an outer peripheral cutting edge;
   a chisel portion located on a distal end side of the end mill body and having the rotational axis;
   an end cutting edge comprising:
   two first cutting edges located on the distal end side of the end mill body, the two first cutting edges extending from an outer periphery to connect with the chisel portion and being point symmetrical with the rotational axis serving as a center of symmetry when viewed from a distal end; and
   an even number of second cutting edges located between the two first cutting edges and away from the chisel portion, extending from the outer periphery toward a side closer to the rotational axis;
   a first gash opening between a first cutting edge of the two first cutting edges and a second cutting edge of the even number of second cutting edges from the chisel portion and at least a portion of the first cutting edge of the two first cutting edges on a side closer to the chisel portion; and
   a second gash located adjacently to the first gash in a rotational direction, and opening to a side closer to the outer peripheral from a side closer to the chisel portion;
   wherein a ratio (L1/L2) of a length L1 from a distal end of the end mill body to a terminal end of the first gash to a length L2 from the distal end of the end mill body to a terminal end of the second gash, when viewed from a side, is from 0.8 to 1.1.

2. The end mill according to claim 1, wherein a thickness of the chisel portion gradually decreases form the side closer to the outer peripheral toward a side closer to the rotational axis, when viewed from the distal end.

3. The end mill according to claim 1, wherein an area S1 of the first gash is smaller than an area S2 of the second gash when viewed from a side where areas of the first gash and the second gash are largest.

4. The end mill according to claim 1, further comprising:
   a first rear surface located rearward of a first cutting edge of the two first cutting edges in the rotational direction; and
   a second surface located rearward of a second cutting edge of the even number of second cutting edges in the rotational direction,
   wherein a ratio (S3/S4) of an area S3 of the first rear surface to an area S4 of the second cutting edge rear surface is from 1.0 to 1.2, when viewed from the distal end.

5. The end mill according to claim 1, wherein a first angle γ1 formed between the rotational axis and a contour of the first gash located frontward in the rotational direction is less than a second angle γ2 formed between the rotational axis and a contour of the second gash located frontward in the rotational direction, in a cross-sectional view along the rotational axis.

6. The end mill according to claim 1, wherein
   the even number of second cutting edges comprises a first edge adjacent to a first cutting edge of the two first cutting edge rearward in the rotational direction and a second edge to the first cutting edge frontward in the rotational direction,
   when viewed from the distal end, an angle between the first cutting edge and the first edge is greater than an angle between the first cutting edge and the second edge.

7. The end mill according to claim 1, wherein the first gash and the second gash each comprise a recessed curved surface rearward in the rotational direction, and a radius of curvature of the recessed curved surface of the second gash is greater than a radius of curvature of the recessed curved surface of the first gash, when viewed from a side.

8. A method for manufacturing a machined product, comprising:
   rotating the end mill according to claim 1;
   bringing the end mill that is rotating and a workpiece into contact with each other; and
   moving the end mill away from the workpiece.

* * * * *